Oct. 23, 1945.  W. A. WALDIE  2,387,424
COATING COMPOSITIONS
Filed Oct. 25, 1943
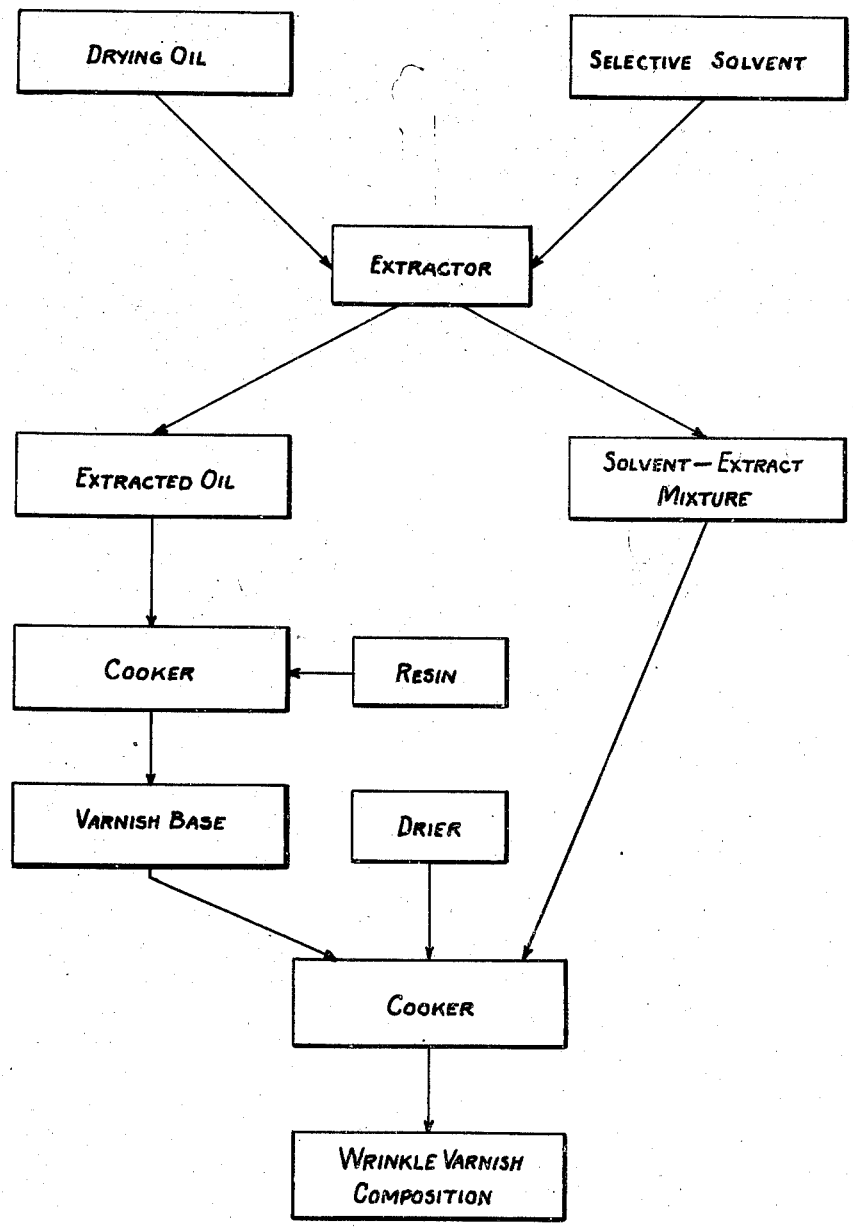
INVENTOR
WILLIAM A. WALDIE,
BY
Toulmin & Toulmin
ATTORNEYS Patented Oct. 23, 1945

2,387,424

UNITED STATES PATENT OFFICE 2,387,424

COATING COMPOSITION

William Allshire Waldie, Oakwood, Ohio, assignor to New Wrinkle, Inc., Wilmington, Del., a corporation of Delaware Application October 25, 1943, Serial No. 507,495

6 Claims. (Cl. 106—222)

This invention relates to coating compositions, and more particularly deals with coating compositions which dry to a wrinkle when applied on a surface and dried by heat or otherwise.

The present invention is concerned primarily with the production of such wrinkle drying coating compositions from oils which are normally nonwrinkling in character. These oils include, for example, linseed oil and soya bean oil.

According to the present invention, a normally nonwrinkling drying oil such as linseed oil or soya bean oil is treated with a selective solvent such as furfural, furfural acetone, furfuryl alcohol, and tetrahydrofurfuryl alcohol. The solvent-extract mixture is then separated, and the remaining portion of the oil is compounded with oil-soluble resins, either natural or synthetic, to form a wrinkle varnish base. The solvent-extract mixture previously separated from the oil is then added to the wrinkle varnish base and reacted therewith to form a homogeneous composition which when admixed with suitable driers yields the wrinkle varnish of the present invention.

The essence of the present invention lies in the separation from the oil of the extractable portion thereof and in admixing that extractable portion together with the extraction solvent with the wrinkle varnish base made by reacting the remainder of the oil with resin in the usual manner. The addition of the extracted portion of the oil and the extraction solvent to the wrinkle varnish base which results from the inter-reaction of the remainder of the oil and the resin brings about a modification of the wrinkle texture which is a characteristic of the selectively extracted oil and resin reaction product which is herein called the wrinkle varnish base.

The extraction of the drying oil with the selective solvent may be carried out in any suitable manner as is customary in the art. Extraction under reflux proves quite satisfactory, and the two layers which form after the extraction has been completed and the oil has been allowed to lie quiescent for time sufficient to obtain full separation may be separated by decantation or otherwise depending on individual preference and conditions.

The extracted oil remaining after separation of the solvent and the extracted portion commingled therewith may be reacted with the resin at temperatures and other conditions such as generally employed in the art to form a wrinkle varnish base.

The solvent and extract from the oil may be added to the wrinkle varnish base at such temperature as might prove most advantageous. This temperature might vary from 200 to 400 °F. Obviously, the lower the temperature the longer the period required to produce a homogeneous mixture. A temperature of 300° F. might be considered the most satisfactory under usual conditions. It will be obvious that the temperature should be varied according to the boiling point of the particular solvent or mixture of solvents employed in order to minimize the loss of solvent.

According to the present invention, the quantity of solvent in the solvent-extract mixture added to the wrinkle varnish base should be sufficient to produce the consistency which is desirable for proper application of the resulting wrinkle varnish, but, if necessary or desirable, additional quantities of the same solvent or mixture of solvents or of any compatible solvent or mixture of solvents may be added to bring the wrinkle varnish to the desired consistency or body for the mode of application to be utilized.

The drier may be added to the wrinkle varnish base either before or after or during the addition of the solvent-extract mixture thereto. Cobalt naphthenate containing 4% metal is a suitable drier, but those skilled in the art will understand that other driers generally employed in the formulation of wrinkle coating compositions may be employed successfully and satisfactorily in the practice of the present invention.

The individual furan derivative solvents above enumerated may be employed individually or in mixtures thereof, and other solvents compatible with them may be used in admixture therewith.

By way of illustration, a flow sheet showing diagrammatically the steps of the method of the present invention is given in the annexed drawing.

It will be understood that while there have been described herein certain embodiments of the present invention, it is not intended thereby to have this invention limited to or circumscribed by the specific details of procedure, conditions, substances, or materials herein described or illustrated in the drawing in view of the fact that the present invention is susceptible to modifications according to individual preference and conditions without departing from the spirit of this disclosure and the scope of the appended claims.

I claim:

1. The method of making a wrinkle varnish coating composition which comprises extracting a non-conjugated type drying oil with a selective solvent comprising solvent selected from the group consisting of furfural, furfural acetone, furfuryl alcohol, and tetrahydrofurfuryl alcohol, separating the solvent-extract mixture from said oil, reacting the remaining oil with resin to form a wrinkle varnish base, adding drier and the solvent-extract mixture to said varnish base, and heat treating the mixture further at a temperature of from 200 to 400° F. to produce a wrinkle varnish coating composition.

2. As a new article of manufacture, a wrinkle varnish coating composition having the characteristics of a product produced according to the method of claim 1.

3. The method of making a wrinkle varnish coating composition which comprises extracting a non-frosting drying oil selected from the group consisting of linseed oil and soya bean oil with a selective solvent selected from the group consisting of furfural, furfural acetone, furfuryl alcohol, tetrahydrofurfuryl alcohol, and mixtures thereof, separating the solvent-extract mixture from said oil, reacting the remaining oil with resin to form a wrinkle varnish base, adding drier and the solvent-extract mixture to said varnish base, and heat treating the mixture further at a temperature of from 200 to 400° F. to produce a wrinkle varnish coating composition.

4. As a new article of manufacture, a wrinkle varnish coating composition having the characteristics of a product produced according to the method of claim 3.

5. The method of making a wrinkle varnish coating composition which comprises extracting a non-conjugated type drying oil selected from the group consisting of linseed oil and soya bean oil with a selective solvent selected from the group consisting of furfural, furfural acetone, furfuryl alcohol, tetrahydrofurfuryl alcohol, and mixtures thereof, separating the solvent-extract mixture from said oil, reacting the remaining oil with resin to form a wrinkle varnish base, adding drier and the solvent extract mixture to said varnish base, and heat treating the mixture further at a temperature of approximately 300° F. to produce a wrinkle varnish coating composition.

6. In a method of making a wrinkle varnish coating composition: The step (a) treating a non-wrinkling non-conjugated drying oil with a selective solvent selected from the group consisting of furfural, furfural acetone, furfural alcohol and tetrahydrofurfural alcohol; the step (b) separating the solvent extract mixture and adding to the remaining portion oil soluble resins that are compounded therewith; the step (c) adding the solvent extract mixture previously separated and causing it to react at a temperature of from 200° to 400° F. with the wrinkle varnish base heretofore formed in order to form a homogeneous composition which, when admixed with suitable driers, yields a wrinkle varnish.

WILLIAM ALLSHIRE WALDIE.